April 11, 1961  E. J. BIRKENBACH ET AL  2,979,139
LOCKING DEVICE FOR ADJUSTING ARM OF HARROW
SHOCK ABSORBING DEVICE
Filed June 4, 1959
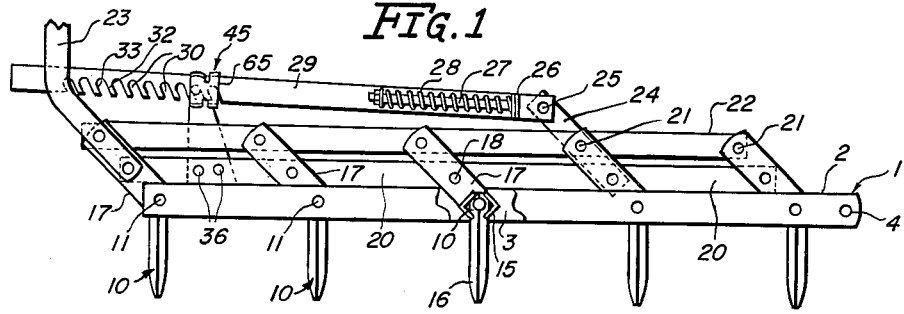
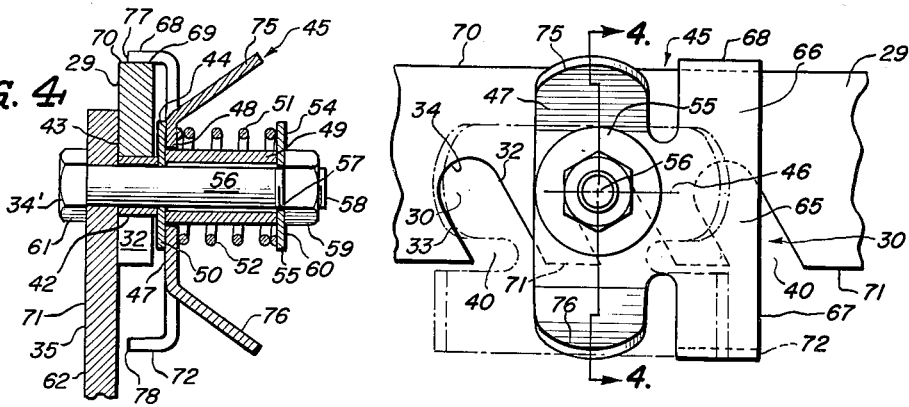
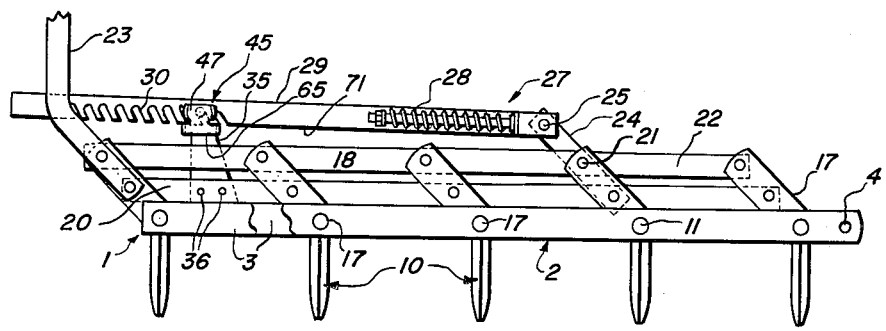
INVENTORS
Eugene J. Birkenbach
John J. Frelichowski
BY Paul O. Lippel
ATTY.

United States Patent Office 2,979,139
Patented Apr. 11, 1961

2,979,139
LOCKING DEVICE FOR ADJUSTING ARM OF HARROW SHOCK ABSORBING DEVICE

Eugene J. Birkenbach, Des Plaines, and John J. Frelichowski, Lemont, Ill., assignors to International Harvester Company, Chicago, Ill., a corporation of New Jersey Filed June 4, 1959, Ser. No. 818,055

7 Claims. (Cl. 172—635)

This invention relates generally to agricultural implements and more specifically to harrows.

An object and general nature of the present invention is the provision of a novel locking device for the shock absorbing adjusting arm of the harrow, the device holding the related parts in operative engagement without restricting their functional action.

A more specific object of the invention is to provide a novel locking device which has two positions, one for releasably interlocking the parts in a selected operating position, and the other position for readily releasing the parts so that they may be moved to selected adjusted positions.

These and other objects of the invention will become more apparent from the specification and the drawings, wherein:

Figure 1 is a side elevational view of a harrow partially in longitudinal section incorporating the invention and showing the locking device in locked position;

Figure 2 is a view similar to that shown in Figure 1 showing the lock in unlocked position;

Figure 3 is an enlarged side elevational view of the latch shown in locking position and in phantom lines in unlocked position; and Figure 4 is a transverse vertical sectional view taken substantially on the line 4—4 of Figure 3.

Describing the invention in detail, the harrow section is indicated in its entirety by the reference numeral 1 and includes a frame 2 composed of right and left hand side rails 3 each of which is provided with an eye 4 at the forward end of the frame for hitching connection to a draft frame such as is well known to those skilled in the art.

The harrow includes a plurality of tooth bars 10 which extend between the members 3, 3 and are provided with end pivots 11 which journal in the respective side members 3 and permit pivotal movement of the tooth bars 10 about generally horizontal axes transverse to the direction of movement of the harrow.

Each tooth bar comprises a rigid beam 15 (Fig. 1) to which are connected a plurality of dependent teeth 16. An upwardly extending lever arm 17 is connected to each tooth bar beam member 15 approximately at the center thereof and the arms 17 are aligned in a fore and aft direction and are pivotally connected intermediate their ends as at 18 to a lower set bar 20 at longitudinally spaced points thereon and the arms 17 are pivotally connected at their upper ends as at 21 to longitudinally spaced points of an upper set bar 22 which extends parallel to the bar 20. The bars 20 and 22 are generally parallel with the frame 2 of the harrow section.

The rearwardmost arm or extension 17 is connected to an upwardly extending set lever 23 and the second arm from the front is provided with an extension 24 which connects with the related member 17 at the points 18 and 21. The extension lever arm 24 projects upwardly above the upper set bar 22 and at its upper end is pivoted as at 25 by means of a pin to the forward member 26 of a cushioning assembly 27 which is essentially similar to that shown in my copending application of Eugene J. Birkenbach et al., filed March 31, 1958, Serial No. 725,413, entitled Harrow With Shock Absorber Device.

Suffice it to say that the members 26 and 27 are spring urged into retracted or contracted position and resist through spring compression of the springs 28 extension of the front and rear members 26 and 27 attendant to clockwise rotational movement of the teeth 16 of the tooth bars when the tooth bars strike an obstruction or the like. It will be seen that the member 27 has a rearwardly extending bar portion 29 with a plurality of downwardly open slots or serrations 30 defined by forwardly and downwardly sloping front and rear edges 32 and 33 and terminating in an upper edge 34. The slots 30 are selectively received on a pin assembly 34' which is mounted on the upper end of a fixed anchor member 35, the anchor member 35 being connected as at 36 to the lower set bar 20 intermediate the rearwardmost arms 17 and the arm thereahead.

It will be noted that under ordinary circumstances the notched engagement between the notch 30 and the pin assembly 34' will retain the bar in engagement with the pin assembly. However, for traveling over rough terrain and particularly where the elongation and contraction of the cushioning device is continuously taking place, there is a tendency for the bar to be shocked out of engagement and rise to an extent wherein the open lower end 40 of the slot 30 causes the bar to escape from the pin structure or more specifically the spacer 42 which is interposed between one side 43 of the anchor member 35 and a washer 44 which is disposed at the opposite side of the bar 29. As best seen in Figure 4, in order to prevent this condition from occurring and at the same time permitting the anchor member 35 and the bar 20 to assume various angular positions about the axis of pivot of the pin assembly 34, I have provided a novel latch mechanism generally designated 45.

This latch mechanism comprises preferably a flat sheet metal element having a flat body portion 46. The body portion 46 is widened at each end to provide a handhold portion and a latch portion and at the handhold portion 47 is provided with a transverse opening 48 admitting a spacer or sleeve 49 which abuts against the washer 44, the portion 47 being urged into frictional engagement as at 50 with an opposing side of the washer 44 by means of a compression spring 51 which engages the exterior side 52 of the portion 47, the spring 51 surrounding the spacer or sleeve 49 and at its outer end seating as at 54 against an abutment in the form of a washer 55 which is sleeved over the center bolt shank 56, said shank passing through the sleeve 49 and through the opening 57 in the washer 55 and at its outer end being threaded as at 58 and mounting a nut 59 which is threaded on the threads 58 and engaging the outer side 60 of the washer 54 and urging the washer against the adjacent end of the spacer 49 and in turn urging it against washer 44 which abuts against the bushing 42 which in turn is urged against surface 43 of the anchor 35 which reacts against the head 61 of the nut and bolt assembly which engages the outer side 62 of the anchor member 35. Thus it will be seen that the member 29 is relatively free between the surface 43 and the washer 44 so that it has lateral play and can readily rotate with respect to the nut and bolt assembly 34 about the spacer 42 as the angular relationship between the anchor and the member 29 changes pursuant to operation and swinging movement of the tooth bar assemblies 10.

The outer end or latching portion 65 of the latch member comprises a jaw including a pair of outwardly directed lugs 66 and 67 which extend vertically, the upper lug 66 being provided with a transverse inwardly directed lug 68 which on its underside 69 engages with the top side 70 of the member 29, the lower element 67 extending a considerable distance below the lower edge 71 of the bar 29 and being provided with an inturned lug 72 which alternatively may occupy the upper position and engage the top side of the bar while the lug 68 is beneath the bar and spaced the same distance from the lower edge of the bar 29. Thus it will be seen that upward displacement of the tooth bar is absolutely prevented that is to an extent which will permit exit of the tooth bar through the lower open end 40 of the slots 30. However, at the same time the pivoting action in view of the lever arm between the lug 68 and 72 and the axis of pivot about the shank 56 permits angular displacement of the parts. In order to condition the latch to unlocked position, the operator grasps the hand or thumb finger hold or wings 75 and 76 which are disposed at opposite ends of the end portion 47 of the body in covering relation to the spring 51, and pulls on the latch by these holds 75, 76 in a direction compressing the spring 51 whereby clearing the ends 77 and 78 (Fig. 4) of the lugs 68, 72 from the bar 29 and permitting rotation of the latch to its inoperative position as shown in Figure 2. Under these circumstances the bar 29 may then be lifted and its adjustment may be obtained by re-entering the pin assembly 34 into any of the notches 30 as will be readily appreciated by those skilled in the art. Then the latch is turned to the position of Figures 3 and 4 from that shown in Figure 2. It will be noted in Figure 4 that the lugs 68 and 72 are longer than the space between the bar 29 and washer 44 so that the bar 29 cannot escape.

It will be understood that a preferred form of the invention has been shown and that various other forms will be readily apparent to those skilled in the art within the scope of the appended claims.

What is claimed is:

1. In a harrow of the type comprising a frame and pivotal tooth bars and linkage operatively interconnecting all of the tooth bars to move in unison and a shock absorbing device in the linkage including an adjusting bar with downwardly open slots and an anchor, a pivot member on the anchor selectively engageable with the slots for holding the tooth bars in selected angularly set positions, and a latch mechanism comprising an element pivoted on said pivot member and having a jaw portion loosely embracing said adjusting bar.

2. The invention according to claim 1 and said jaw portion comprising vertically directed upper and lower parts and inwardly directed locking lugs, the lug on the upper part engaging an opposing upper edge of the adjusting bar and the lug on the lower part spaced below said adjusting bar.

3. The invention according to claim 1 and said jaw spaced radially from the pivot member and lengthwise of the bar with respect to the slot engaging said pivot member.

4. In a harrow of the type comprising a frame and pivotal tooth bars and linkage operatively interconnecting all of the tooth bars to move in unison and a shock absorbing device in the linkage including an adjusting bar with downwardly open slots and an anchor, a pivot member on the anchor selectively engageable with the slots for holding the tooth bars in selected angularly set positions, the combination of a latch mechanism comprising an element pivoted on said pivot member and having a jaw portion loosely embracing said adjusting bar, said jaw portion spaced radially from said pivot member and resilient means on said pivot member biasing said element toward the anchor with said adjusting bar therebetween.

5. In a harrow of the type having a frame and tooth bars pivotal thereon and yieldable linkage operatively interconnecting the bars and setting them in various working positions, said linkage including an upright anchor with a transverse pivot pin and an adjusting bar above said pivot pin with downwardly open slots positioned to selectively admit said pivot pin, the improvement comprising, latching means for holding the adjusting bar in engagement with the pivot pin throughout their working range comprising a latch member pivoted at one end to the pivot pin and having a jaw at its other end loosely embracing said adjusting bar.

6. In a harrow of the type having a frame and tooth bars pivotal thereon and yieldable linkage operatively interconnecting the bars and setting them in various working positions, said linkage including an upright anchor with a transverse pivot pin and an adjusting bar above said pivot pin with downwardly open slots positioned to selectively admit said pivot pin, the improvement comprising, latching means for holding the adjusting bar in engagement with the pivot pin throughout their working range comprising a latch member pivoted at one end to the pivot pin and having a jaw at its other end loosely embracing said adjusting bar and further characterized in that said latch means comprises a handhold for moving said latch means axially on the pivot pin, and resilient means mounted on the pivot pin and biasing said latch means toward the anchor, said adjusting bar disposed between the anchor and latch means.

7. In a device of the class described, a latch mechanism, an anchor pivot and an adjusting bar with downwardly open slots selectively receiving the pivot, said mechanism comprising an elongated flat element mounted on said pivot at one end and having a bar embracing jaw at the other end, and means releasably holding the element against the bar and accommodating movement of the element axially on said pivot.

References Cited in the file of this patent

UNITED STATES PATENTS

| | | |
|---|---|---|
| 231,080 | Morris et al. | Aug. 10, 1880 |
| 1,243,203 | Nelson | Oct. 16, 1917 |
| 2,236,780 | Oerman | Apr. 1, 1941 |
| 2,307,930 | Kucera | Jan. 12, 1943 |